(12) United States Patent
Yukizane

(10) Patent No.: US 9,007,016 B2
(45) Date of Patent: Apr. 14, 2015

(54) CHARGING APPARATUS AND VEHICLE

(75) Inventor: Ryota Yukizane, Fukuoka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 659 days.

(21) Appl. No.: 13/361,648

(22) Filed: Jan. 30, 2012

(65) Prior Publication Data

US 2012/0206092 A1 Aug. 16, 2012

Related U.S. Application Data

(63) Continuation-in-part of application No. PCT/JP2010/004864, filed on Aug. 2, 2010.

(30) Foreign Application Priority Data

Jul. 31, 2009 (JP) .................................. 2009-178600

(51) Int. Cl.
*H02J 7/00* (2006.01)
*H02J 7/14* (2006.01)
*H04B 3/56* (2006.01)
*B60L 11/18* (2006.01)

(52) U.S. Cl.
CPC .............. *H04B 3/56* (2013.01); *B60L 11/1811* (2013.01); *B60L 11/1816* (2013.01); *B60L 2210/30* (2013.01); *H04B 2203/5491* (2013.01); *Y02T 10/7005* (2013.01); *Y02T 10/7241* (2013.01); *Y02T 90/121* (2013.01); *Y02T 90/127* (2013.01); *Y02T 90/14* (2013.01); *Y02T 90/16* (2013.01); *B60L 11/1838* (2013.01); *Y02T 90/163* (2013.01); *Y02T 90/128* (2013.01)

(58) Field of Classification Search
USPC ......... 320/107, 104, 109, 140, 116, 119, 122, 320/128, 137, 167; 324/426; 307/10.1, 9.1; 363/125, 65, 71
See application file for complete search history.

(56) References Cited

U.S. PATENT DOCUMENTS 7,419,020 B2 * 9/2008 Pott et al. ..................... 180/65.1
7,868,482 B2 * 1/2011 Greene et al. .................. 307/82
(Continued)

FOREIGN PATENT DOCUMENTS

DE          34 11 234      9/1985
EP          1 995 109      11/2008
(Continued)

OTHER PUBLICATIONS

International Search Report dated Jul. 11, 2011.

*Primary Examiner* — Edward Tso
*Assistant Examiner* — Alexis A Boateng
(74) *Attorney, Agent, or Firm* — Seed IP Law Group PLLC

(57) ABSTRACT

A charging apparatus that enables power line communication to be performed even via a charging apparatus. This charging apparatus is provided in a vehicle having an electrical storage apparatus that stores power supplied to a power supply inlet, a wheel driving section that rotates a wheel by means of power stored in the electrical storage apparatus, and an in-vehicle device that is connected to the storage apparatus via a power line; and has an AC/DC conversion section that converts power supplied from the power supply inlet from alternating-current to direct-current and outputs this to the electrical storage apparatus, and a capacitor that causes a power line communication signal input from the power supply inlet to bypass the AC/DC conversion section.

16 Claims, 15 Drawing Sheets

(56) References Cited

U.S. PATENT DOCUMENTS

| | | | |
|---|---|---|---|
| 8,000,858 B2* | 8/2011 | Tonegawa et al. | 701/36 |
| 8,008,923 B2* | 8/2011 | Hammond | 324/426 |
| 8,614,624 B2* | 12/2013 | Stocker et al. | 340/5.8 |
| 2004/0207263 A1* | 10/2004 | Yanagida et al. | 307/10.1 |
| 2008/0224536 A1* | 9/2008 | Yamazaki | 307/1 |
| 2008/0315685 A1* | 12/2008 | Mandalakas et al. | 307/46 |
| 2009/0043450 A1* | 2/2009 | Tonegawa et al. | 701/36 |
| 2009/0144150 A1* | 6/2009 | Sakakibara et al. | 705/14 |
| 2009/0322148 A1* | 12/2009 | Kitanaka | 307/9.1 |
| 2010/0019737 A1* | 1/2010 | Leboeuf | 320/167 |

FOREIGN PATENT DOCUMENTS

| | | |
|---|---|---|
| EP | 2 058 916 | 5/2009 |
| JP | 2007-252016 | 9/2007 |

\* cited by examiner

CHARGING APPARATUS AND VEHICLE

TECHNICAL FIELD

This invention relates to a charging apparatus and vehicle.

BACKGROUND

In recent years, electric vehicles in which an electrical storage apparatus and a rive apparatus as a motor are installed, and, in which the motor is driven using charge power of the electrical storage apparatus, have attracted attention as environment-friendly vehicles. With a vehicle of this kind, power has been supplied by an external charging apparatus. That is to say, power has been supplied in the vehicle from a charging apparatus outside the vehicle body via a power line, and the supplied power has been stored in the electrical storage apparatus (see Related Art 1, for example). Also, with a conventional vehicle, power has been supplied from the electrical storage apparatus to various in-vehicle devices.

CITATION LIST

Related Art

PTL 1: Japanese Patent Application Laid-Open No. 2007-252016

SUMMARY OF INVENTION

Embodiments explained below are related to a charging apparatus. The charging apparatus that is provided in a vehicle having an electrical storage apparatus and an in-vehicle device. The electrical storage apparatus stores power supplied from outside. The in-vehicle device is supplied power from the electrical storage apparatus and performs power line communication for recording information from outside of the vehicle. And the charging apparatus connects electrically an information device outside of the vehicle via a first power line, the in-vehicle device and the electrical storage apparatus via a second power line, and has a power conversion section and a bypass section. The power conversion section converts first power supplied via the first power line to second power and supplies the second power to the electrical storage apparatus via the second power line. The bypass section is connected to the power conversion section in parallel, and is connected between the first power line and the second power line for bypassing a power line communication signal transmitted from the in-vehicle device or the information device.

DESCRIPTION OF EMBODIMENTS

Figure 1:
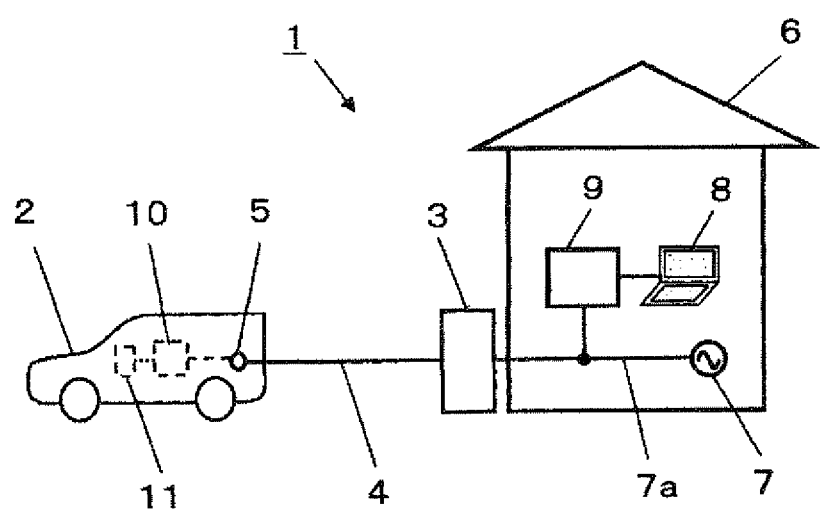
FIG. 1 is a drawing showing a configuration of a vehicle charging system according to Embodiment 1.

Embodiments will be now described with respect to the accompanying drawings. Identical or equivalent parts in the drawings are assigned the same reference codes in the following descriptions.

Embodiment 1

First, a vehicle charging system according to Embodiment 1 will be described with reference to FIG. 1 through FIG. 4. A case will be described here by way of example in which a vehicle is an electric vehicle in which an electrical storage apparatus and a motor that rotates a wheel as a wheel driving section are installed, and the motor is driven using charge power of the electrical storage apparatus.

FIG. 1 is a schematic diagram showing a configuration of vehicle charging system 1 according to Embodiment 1. In FIG. 1, vehicle charging system 1 has charging apparatus 3, and vehicle 2 connected to charging apparatus 3 via power line 4 (a first power line).

In the case of ordinary home 6, charging apparatus 3 is installed at a location adjacent to home 6, and is connected to power supply 7 of home 6. For example, a power plug of charging apparatus 3 is connected to an exterior outlet connected to power line 7a of power supply 7. By this means, power required in charging apparatus 3 is supplied from power supply 7 of home 6.

Then charging apparatus 3 supplies power to vehicle 2 utilizing power of power supply 7 of home 6. By this means, in vehicle charging system 1, power is supplied to vehicle 2 via power line 4, and electrical storage apparatus 10 of vehicle 2 is charged. Electrical storage apparatus 10 has, for example, a lead-acid battery, a lithium-ion battery, or the like.

Figure 2:
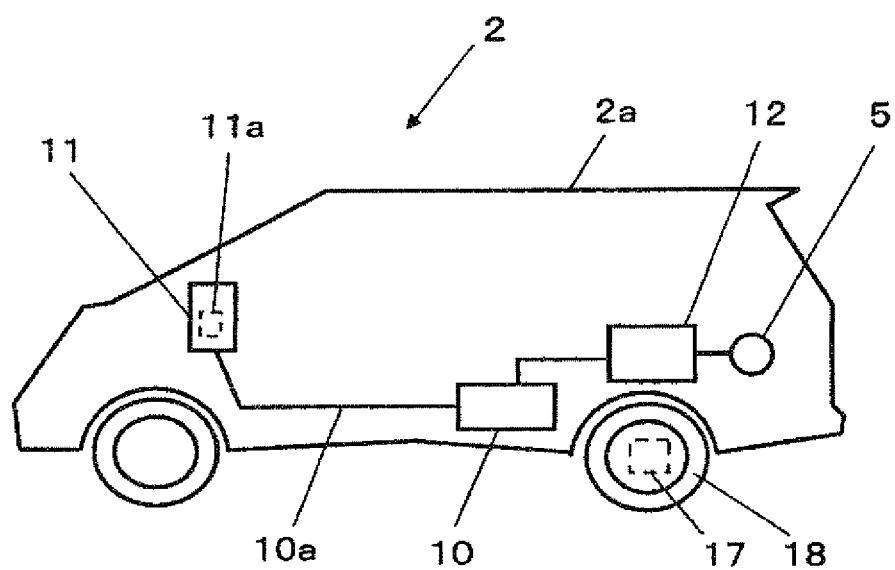
FIG. 2 is a drawing showing a configuration of a vehicle of the above vehicle charging system.

FIG. 2 is a schematic diagram showing a configuration of vehicle 2 of vehicle charging system 1 according to Embodiment 1. As shown in FIG. 2, vehicle 2 stores power in electrical storage apparatus 10 of vehicle body 2a when power is supplied to power supply inlet 5.

However, since electrical storage apparatus 10 stores direct-current power while alternating-current power is used in ordinary home 6, charging apparatus 3 and electrical storage apparatus 10 cannot be directly connected. Consequently, charging apparatus 12 is provided between charging apparatus 3 and electrical storage apparatus 10, and power is converted from alternating-current to direct-current by charging apparatus 12.

Figure 3:
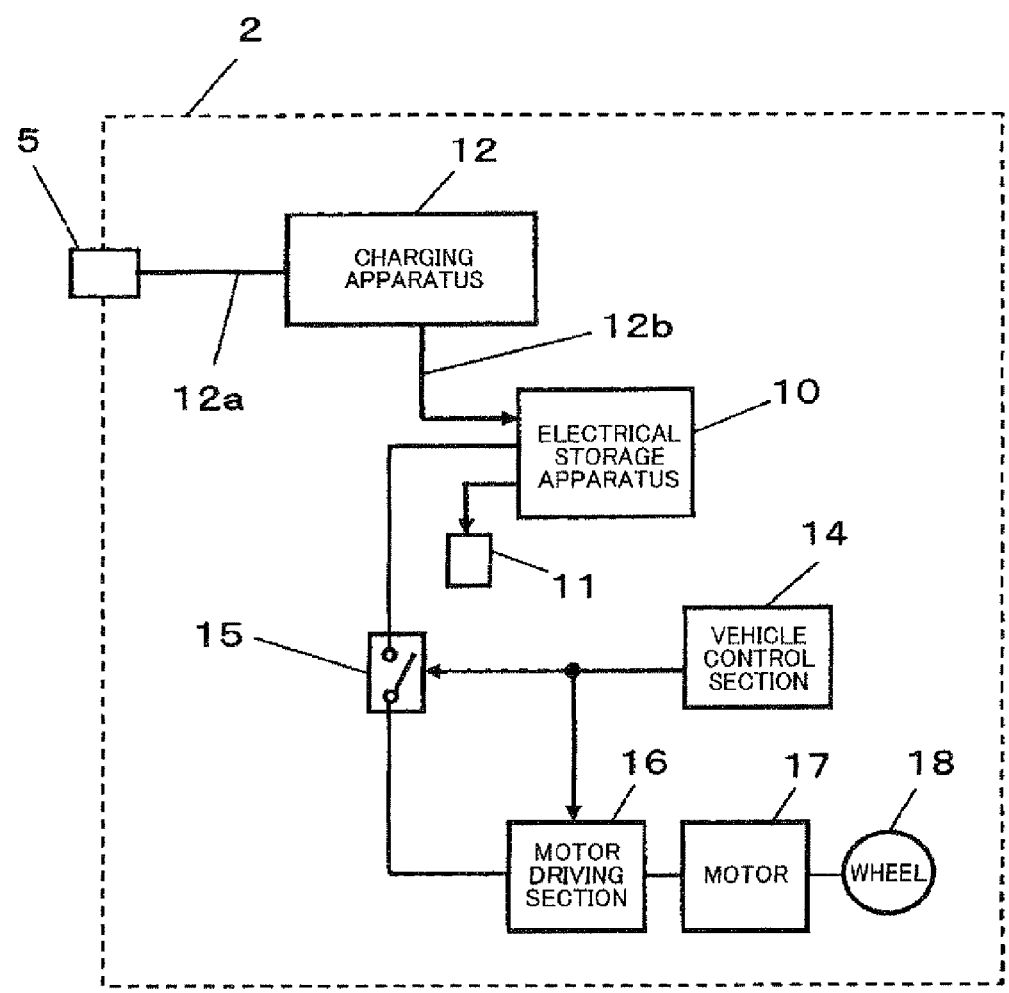
FIG. 3 is a block diagram showing a configuration of a vehicle of the above vehicle charging system.

FIG. 3 is a block diagram showing a configuration of vehicle 2 of vehicle charging system 1 according to Embodiment 1. As shown in FIG. 3, power supply inlet 5 is connected to charging apparatus 12 via power line 12a, and charging apparatus 12 is connected to electrical storage apparatus 10 via power line 12b.

When performing a charging operation, the vehicle owner first places the vehicle key of vehicle 2 in a stopped state to prevent vehicle 2 from moving forward or otherwise starting to move by itself, and then leaves vehicle 2—that is, stops the supply of power from electrical storage apparatus 10 to motor driving section 16 for safety. To be more specific, when vehicle 2 is placed in a stopped state, the switch (connecting section) is placed in the open state—that is, the switch is placed in a non-connecting state—and stops the supply of power from electrical storage apparatus 10 to motor driving section 16.

The vehicle owner then connects power line 4 from charging apparatus 3 to power supply inlet 5 of vehicle 2. By this means, power can be supplied to vehicle 2 from charging apparatus 3.

After the charging operation has been completed, in vehicle 2 power stored in electrical storage apparatus 10 is supplied to motor driving section 16, and motor (wheel driving section) 17 is driven by motor driving section 16. Also, in vehicle 2, motor driving section 16 is controlled by vehicle control section 14, and wheel 18 is rotated by motor 17, enabling vehicle 2 to move to another location.

Referring to FIG. 1, since a vehicle 2 charging operation takes several hours, if power line communication can be performed from information device 8 in home 6 to in-vehicle device 11 of vehicle 2 via power line 7a and power line 4 during this charging, this is convenient in enabling new information to be recorded easily in in-vehicle device 11 without new wiring. A personal computer, for example, can be utilized as information device 8, and a car navigation system or the like, for example, can be used as in-vehicle device 11. If travel destination information or the like is transmitted to and recorded in this in-vehicle device 11, this is convenient in enabling the charging time to be utilized efficiently. In-vehicle device 11 is connected to power line 10a of electrical storage apparatus 10 (a second power line), and has power supplied thereby. Also, a communication section (not shown) of in-vehicle device 11 is connected to power line 10a of electrical storage apparatus 10 via power line communication section 11a.

However, charging apparatus 12 (FIG. 2) is designed so that an element such as a switching transformer used in the circuitry has little loss at a low-frequency commercial frequency, and therefore cannot allow passage of a high-frequency signal of power line communication, since loss is large with such a signal. Consequently, power line communication cannot be performed between information device 8 and invehicle device 11.

Figure 4:
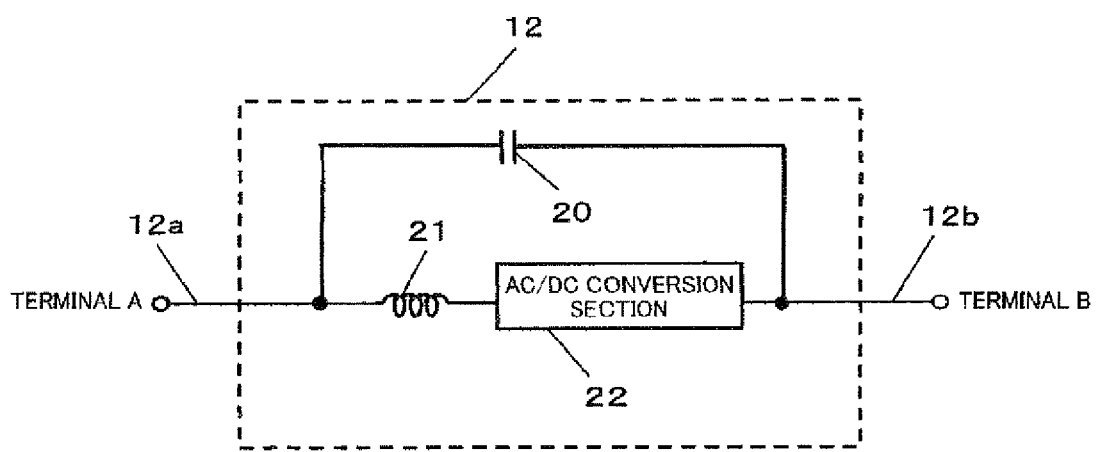
FIG. 4 is a block diagram showing a configuration of a charging apparatus installed in the vehicle shown in FIG. 2.

Thus, in Embodiment 1, charging apparatus 12 is configured as shown in FIG. 4. FIG. 4 is a block diagram showing the configuration of charging apparatus 12 installed in vehicle 2 shown in FIG. 2.

That is to say, charging apparatus 12 has AC/DC conversion section 22 (a first power conversion section) that converts supplied power from alternating-current to direct-current, with terminal A and terminal B connected via capacitor 20 (a first bypass section). Here, terminal A is connected to power supply inlet 5, and terminal B is connected to electrical storage apparatus 10. Terminal A functions as an input terminal to which alternating-current power is input from the power supply inlet, and terminal B functions as an output terminal that outputs direct-current power converted by AC/DC conversion section 22. AC/DC conversion section 22 has, for example, an AC/DC converter.

AC/DC conversion section 22 converts power from alternating-current to direct-current. An alternating current (at a voltage of 100 volts to 200 volts, for example) is converted to a direct current (at a voltage of approximately 300 volts for use by motor electrical storage section 10b or 12 volts to 14 volts for use by in-vehicle device electrical storage section 10c in FIG. 5, as described later herein, for example). Motor electrical storage section 10b and in-vehicle device electrical storage section 10c have, for example, a lead-acid battery, a lithium-ion battery, or the like.

By means of this configuration, charging apparatus 12 can convert power supplied from power supply inlet 5 from alternating-current to direct-current, and supply the converted power (direct-current) to electrical storage apparatus 10. A power line communication signal has a frequency in the range of 2 MHz to 30 MHz, and a high-frequency signal is used. Consequently, a power line communication signal can pass through capacitor 20. By this means, a power line communication signal is passed through charging apparatus 12 by being made to bypass AC/DC conversion section 22 by means of capacitor 20.

Coil 21 is provided as an impedance element between terminal A and AC/DC conversion section 22. Coil 21 is a passive element comprising a wound power line utilizing inductance. By this means, a power line communication signal is led around and absorbed into AC/DC conversion section 22, and the occurrence of signal loss is prevented. At 50 Hz to 60 Hz, the frequency of an alternating current supplied from power supply inlet 5 is low compared with that of a power line communication high-frequency signal, and therefore the inductance of coil 21 can be made small, and power loss can thereby be made small. Coil 21 may alternatively be provided between terminal B and AC/DC conversion section 22, or may be provided both between terminal A and AC/DC conversion section 22 and between terminal B and AC/DC conversion section 22. Another element may be provided instead of coil 21, as long as it has an impedance to absorb a power line communication signal.

Not only alternating-current power but also direct-current power can be envisaged as being supplied to power supply inlet 5. In this case, charging apparatus 12 is provided with a DC/DC conversion section instead of an AC/DC conversion section. A DC/DC conversion section converts a direct-current voltage of several tens of volts to several hundreds of volts supplied to power supply inlet 5 to a direct-current voltage suitable for electrical storage apparatus 10.

Figure 5:
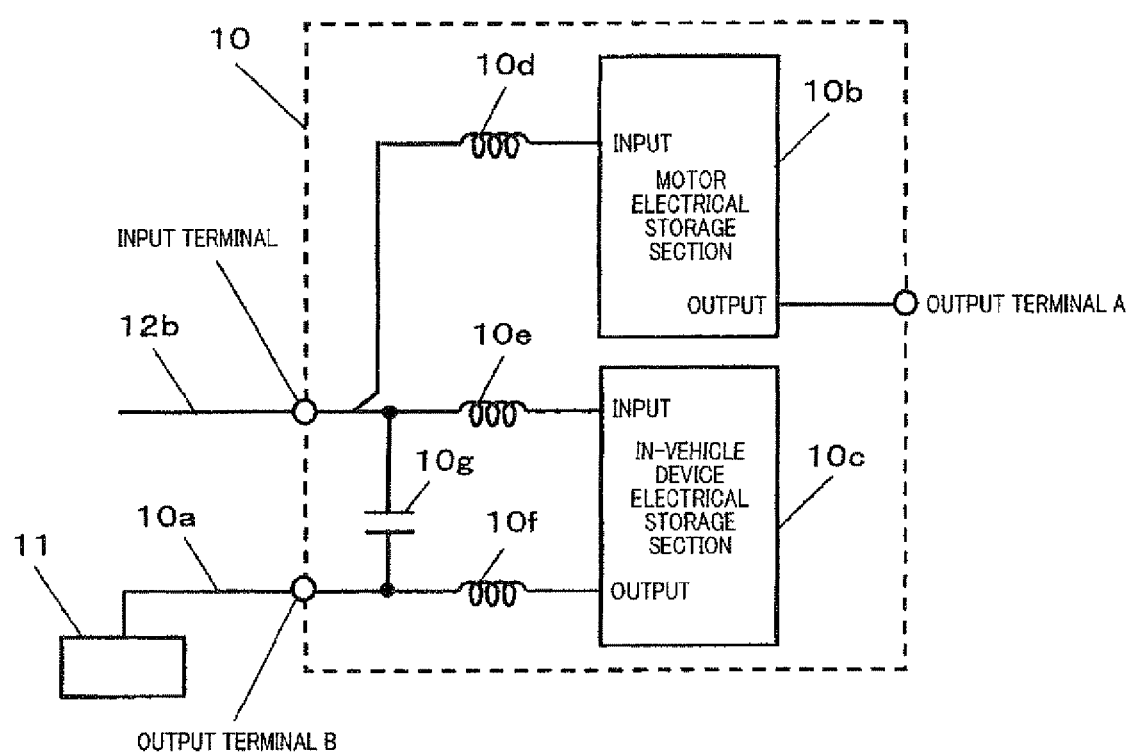
FIG. 5 is a block diagram showing a configuration of an electrical storage apparatus installed in the above vehicle.

FIG. 5 is a block diagram showing a configuration of electrical storage apparatus 10 installed in vehicle 2 shown in FIG. 2. In FIG. 5, electrical storage apparatus 10 has motor electrical storage section 10b, in-vehicle device electrical storage section 10c, coils 10d through 10f, and capacitor 10g.

Motor electrical storage section 10b internally boosts approximately 300-volt power stored from the input terminal via coil 10d to 500 volts to 700 volts, for example, and outputs this to output terminal A. The boosted power is supplied to motor driving section 16 (FIG. 3) from output terminal A via switch 15 (FIG. 3). Absorption of a power line communication signal into motor electrical storage section 10b is prevented by coil 10d. Coil 10d also suppresses noise generated from motor electrical storage section 10b.

In-vehicle device electrical storage section 10c supplies power (at 12 volts to 14 volts, for example) that is input from the input terminal via coil 10e and stored, to in-vehicle device 11 via coil 10f. Absorption of a power line communication signal into in-vehicle device electrical storage section 10c is prevented by coil 10e and coil 10f. Coil 10e and coil 10f also suppress noise generated from in-vehicle device electrical storage section 10c.

The input terminal and output terminal B are connected via capacitor 10g. A power line communication signal can follow a bypass route from the input terminal to output terminal B via capacitor 10g. By this means, a power line communication signal can pass between terminal B of charging apparatus 12 (FIG. 4) and in-vehicle device 11 via power line 12b, capacitor 10g, and power line 10a.

If in-vehicle device electrical storage section 10c input and output are common in FIG. 5, the input terminal and output terminal B can be shorted, and capacitor 10g may be omitted. Also, coil 10e and coil 10f can be replaced by a single coil. In this case, terminal B of charging apparatus 12 (FIG. 4) and in-vehicle device 11 are directly connected via power line 12b and power line 10a. In this case, also, absorption of a power line communication signal into in-vehicle device electrical storage section 10c is prevented, and noise generated from in-vehicle device electrical storage section 10c can be suppressed by the coil.

As described above, according to Embodiment 1, as shown in FIG. 1 and FIG. 2, a power line communication signal can bypass AC/DC conversion section 22 by means of capacitor 20 inside charging apparatus 12, enabling information device 8 and invehicle device 11 to perform power line communication even via charging apparatus 12. By this means, if information device 8 is connected to power line 7a of home 6 via power line communication apparatus 9, for example, travel destination information or the like can be transmitted to and recorded in in-vehicle device 11 of vehicle 2 by information device 8 from inside home 6, the time during charging can be used efficiently, and convenience is improved.

Embodiment 2

Next, vehicle 2 according to Embodiment 2 will be described with reference to FIG. 6 and FIG. 7. In Embodiment 2, a plurality of devices are made to communicate via a power line using another sample configuration of vehicle 2.

Figure 6:
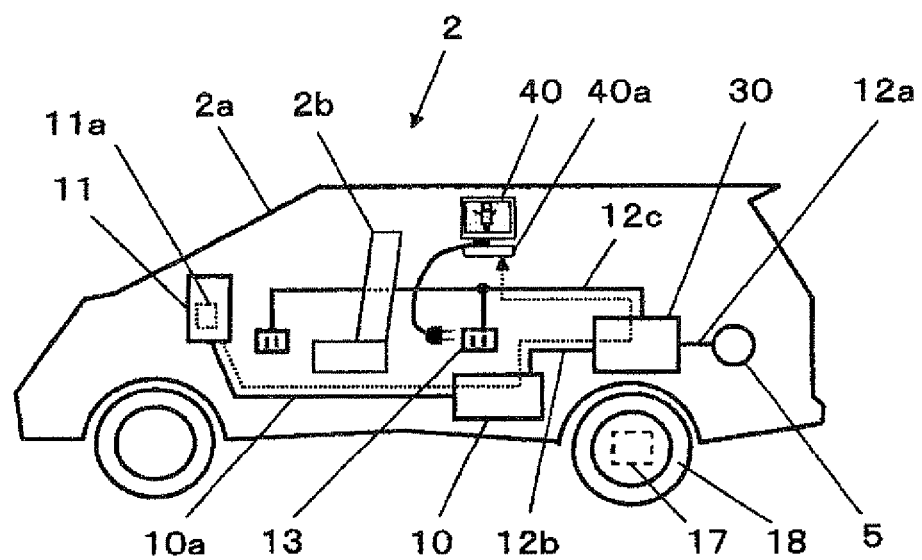
FIG. 6 is a schematic diagram showing a configuration of a vehicle according to Embodiment 2.

FIG. 6 is a schematic diagram showing a configuration of vehicle 2 according to Embodiment 2. In FIG. 6, provision is made, for example, for in-vehicle device 11 and invehicle device 40 to communicate inside vehicle 2, and for video output to a screen of in-vehicle device 11 installed in front of seat 2b to also be viewable on in-vehicle device 40 located behind seat 2b. A device that can operate on an alternating-current power supply—that is, power supply 7 of home 6 in FIG. 1—is used as in-vehicle device 40.

In this case, charging apparatus 30 needs to perform power conversion of electrical storage apparatus 10 power from direct-current to alternating-current, and output this to power line 12c. Power line 12c is provided with outlet 13, and a power plug of in-vehicle device 40 is connected to this outlet 13. If the output voltage of power line 12c is made 100 volts to 120 volts, this offers the convenience of being able to use directly an electrical product that is used in an ordinary home. Also, in-vehicle device 40 has power line communication section 40a, and power line communication is performed by connecting power line communication section 40a to power line 12c.

Figure 7:
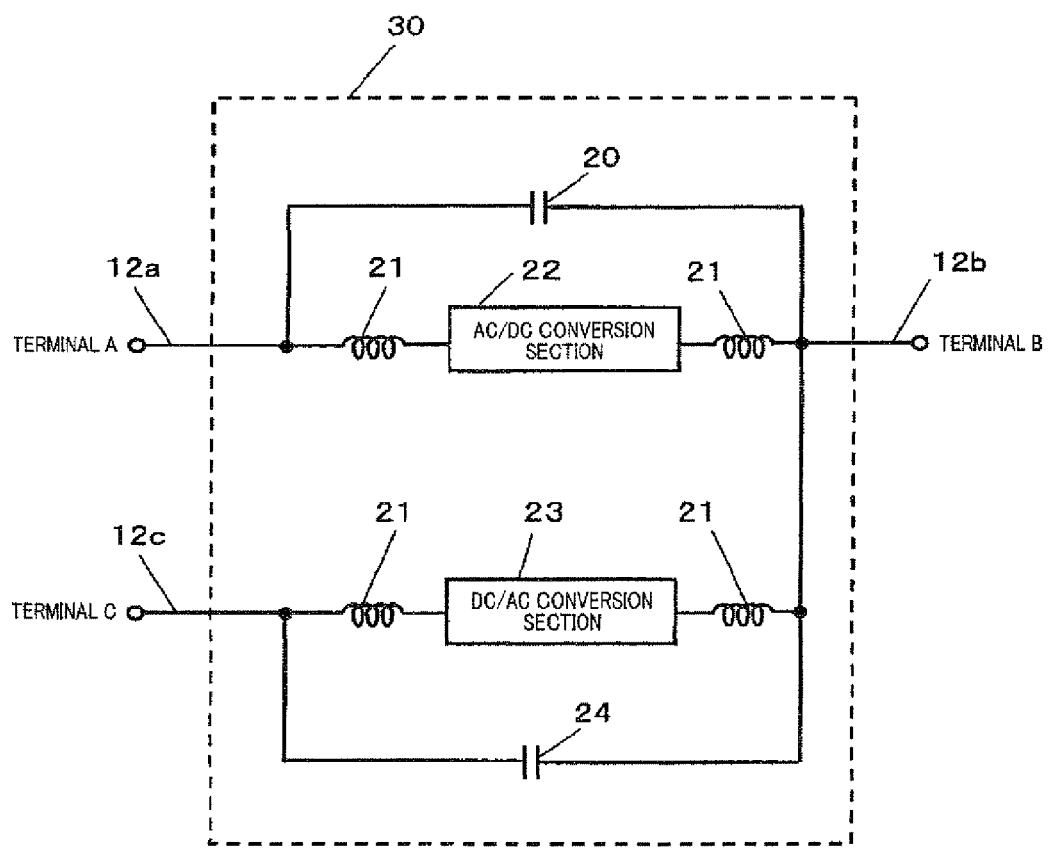
FIG. 7 is a block diagram showing a configuration of a charging apparatus of the above vehicle.

FIG. 7 is a block diagram showing a configuration of charging apparatus 30 of vehicle 2 according to Embodiment 2. As shown in FIG. 7, charging apparatus 30 has capacitor 20, coils 21, AC/DC conversion section 22, DC/AC conversion section 23 (a second power conversion section), and capacitor 24 (a second bypass section). DC/AC conversion section 23 has, for example, a DC/AC converter.

Capacitor 20, coils 21, and AC/DC conversion section 22 are the same as in charging apparatus 12.

DC/AC conversion section 23 performs power conversion of power from direct-current to alternating-current, converting, for example, a direct-current voltage of electrical storage apparatus 10 (for example, 12 volts to 14 volts) to an alternating-current voltage (for example, 100 volts to 120 volts).

However, as with AC/DC conversion section 22, DC/AC conversion section 23 is designed so that an element such as a switching transformer used in the circuitry has little loss at a commercial low frequency, and therefore cannot allow passage of a high-frequency signal of power line communication, since loss is large with such a signal. Consequently, a power line communication signal cannot pass from terminal B to terminal C or from terminal C to terminal B, and power line communication cannot be performed between in-vehicle device 11 and in-vehicle device 40 via charging apparatus 30.

Thus, in Embodiment 2, terminal B and terminal C are connected via capacitor 24. Here, terminal B is connected to electrical storage apparatus 10 via power line 12b, terminal C is connected to outlet 13 via power line 12c, and terminal A is connected to power supply inlet 5 via power line 12a.

By this means, a power line communication signal is passed to terminal C from terminal B by being made to bypass DC/AC conversion section 23 via capacitor 24, and is thereby passed through charging apparatus 30. Similarly, a power line communication signal is passed to terminal B from terminal C by being made to bypass DC/AC conversion section 23 via capacitor 24, and is thereby passed through charging apparatus 30.

Also, through the provision of capacitor 24, a power line communication signal is passed to terminal C from terminal A by being made to bypass AC/DC conversion section 22 and DC/AC conversion section 23 via capacitor 20 and capacitor 24. Similarly, a power line communication signal is passed to terminal A from terminal C by being made to bypass AC/DC conversion section 22 and DC/AC conversion section 23 via capacitor 20 and capacitor 24. By this means, information device 8 can perform power line communication with in-vehicle device 11 or in-vehicle device 40 via charging apparatus 30.

Also, similarly to the case illustrated in FIG. 4 of Embodiment 1, in order to prevent a power line communication signal from being absorbed into AC/DC conversion section 22 and DC/AC conversion section 23, coil 21 is provided between terminal A and AC/DC conversion section 22, between terminal B and AC/DC conversion section 22, between terminal B and DC/AC conversion section 23, and between terminal C and DC/AC conversion section 23. Terminal A functions as an input terminal that inputs alternating-current power to AC/DC conversion section 22. Terminal B functions as an output terminal that outputs direct-current power converted by AC/DC conversion section 22, and also functions as an input terminal that inputs direct-current power supplied from electrical storage apparatus 10 to DC/AC conversion section 23. Terminal C functions as an output terminal that outputs alternating-current power converted by DC/AC conversion section 23. Coil 21 need not always be provided on both sides of AC/DC conversion section 22 and DC/AC conversion section 23, and may be provided at least either between terminal A and AC/DC conversion section 22 or between terminal B and AC/DC conversion section 22. Similarly, coil 21 may be provided at least either between terminal B and DC/AC conversion section 23 or between terminal C and DC/AC conversion section 23. Another element may be provided instead of coil 21, as long as it has an impedance to absorb a power line communication signal.

Figure 8:
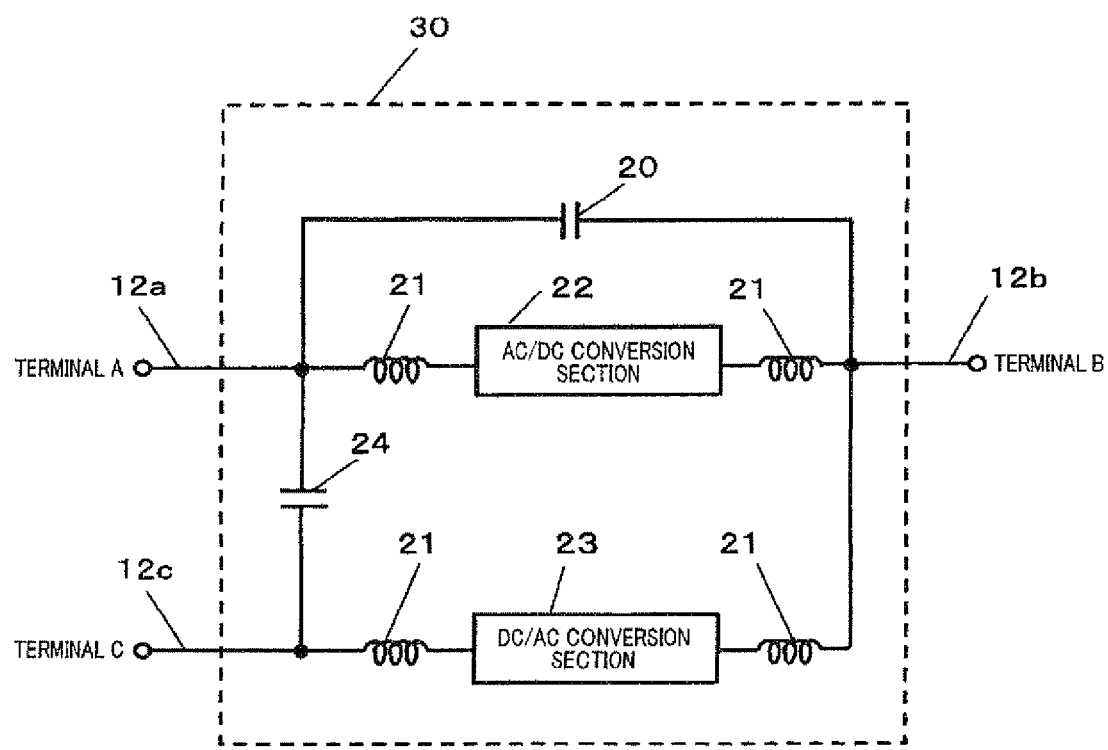
FIG. 8 is a block diagram showing a sample variant of FIG. 7.

In charging apparatus 30 in FIG. 7, capacitor 24 is connected to terminal B and terminal C, but this is by no means limiting. For example, terminal A and terminal C may be connected via capacitor 24 as shown in FIG. 8. By this means, also, a power line communication signal can be passed from terminal A to terminal C via capacitor 24. Similarly, a power line communication signal can be passed from terminal C to terminal A via capacitor 24.

A case can also be envisaged in which direct-current power is supplied to terminal C in the charging apparatus shown in FIG. 7. In this case, DC/AC conversion section 23 is replaced by a DC/DC conversion section. A DC/DC conversion section converts a direct-current voltage of approximately 300 volts supplied from terminal B to a direct-current voltage of approximately 10+ volts, and outputs this to terminal C.

Also, a power line communication signal can be passed to terminal C from terminal B by being made to bypass AC/DC conversion section 22 and DC/AC conversion section 23 via capacitor 20 and capacitor 24. Similarly, a power line communication signal can be passed to terminal B from terminal C by being made to bypass AC/DC conversion section 22 and DC/AC conversion section 23 via capacitor 20 and capacitor 24.

Capacitor 20 between terminal A and terminal B in FIG. 8 may be removed, and terminal B and terminal C may be connected via capacitor 20. By this means, also, a power line communication signal can be similarly passed between terminal A and terminal B, between terminal B and terminal C, and between terminal A and terminal C.

Figure 9:
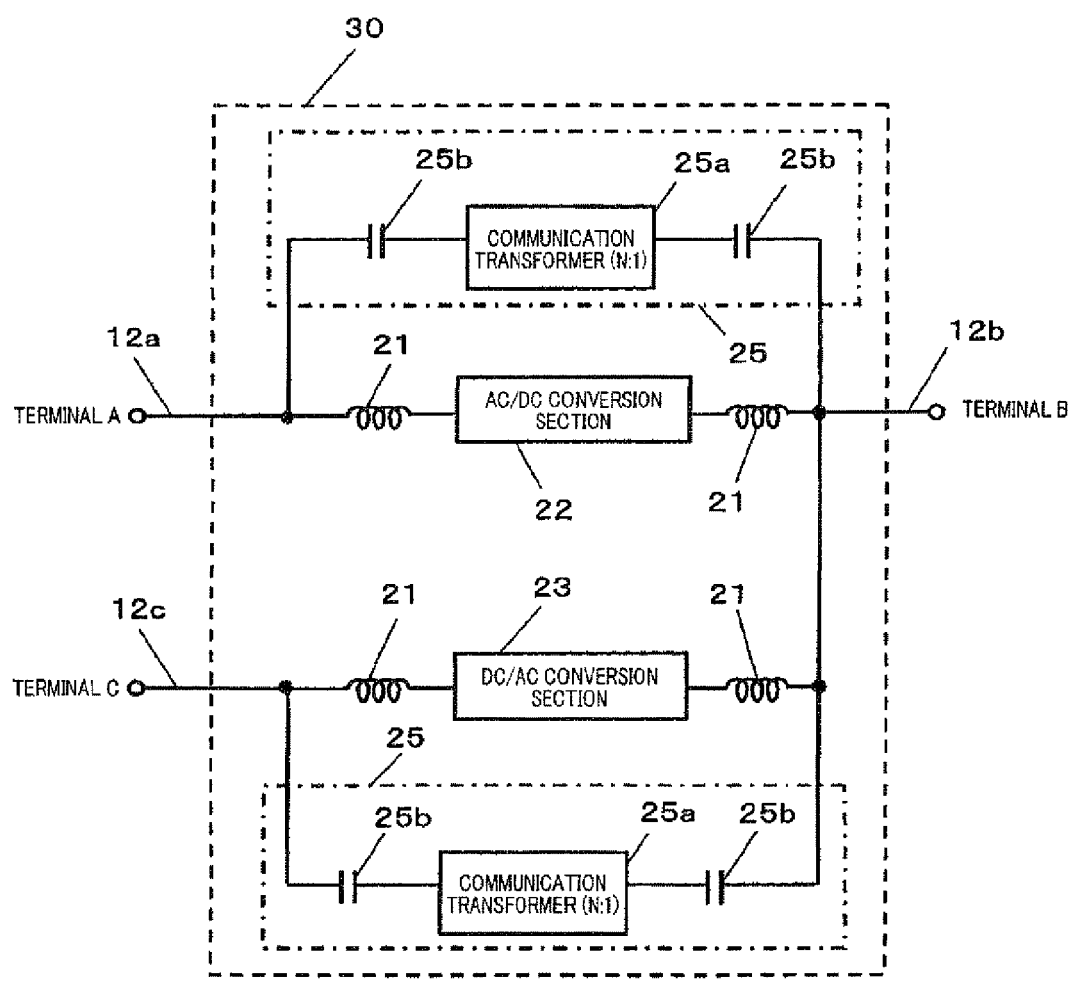
FIG. 9 is a block diagram showing another sample variant of FIG. 7.

If the line impedance of terminal A is high and the line impedance of terminal B is low, as shown in FIG. 9, an impedance mismatch state will arise.

Thus, bypass section 25 may be provided instead of capacitor 20 in FIG. 7. Bypass section 25 has communication transformer 25a having a winding ratio of N:1, and capacitors 25b connected in series to both sides of this communication transformer 25a. With communication transformer 25a, the winding ratio on the side of the terminal of the higher line impedance is increased according to the line impedance. In FIG. 9, the line impedance on the terminal A side is high, and therefore the winding ratio on the terminal A side is made higher. By this means, a power line communication signal can be passed from terminal A to terminal B or from terminal B to terminal A while providing impedance matching between terminal A and terminal B.

Similarly, bypass section 25 may be provided instead of capacitor 24 in FIG. 7 if terminal C line impedance is high and terminal B line impedance is low. In this case, with communication transformer 25a, the winding ratio on the side of terminal C of the higher line impedance. By this means, a power line communication signal can be passed from terminal B to terminal C or from terminal C to terminal B while providing impedance matching between terminal C and terminal B.

As described above, according to Embodiment 2, as shown in FIG. 6 and FIG. 7, a power line communication signal can bypass AC/DC conversion section 22 and DC/AC conversion section 23 by means of capacitor 20 or capacitor 24 inside charging apparatus 30, and power line communication can be performed even via charging apparatus 30.

By this means, power line communication can be performed between a plurality of devices via charging apparatus 30 inside vehicle 2, and, for example, in-vehicle device 11 and in-vehicle device 40 can be made to communicate, and video output to the screen of in-vehicle device 11 installed in front of seat 2b can also be viewed on invehicle device 40 located behind seat 2b. A plurality of devices can be operated in concert inside vehicle 2, and convenience is improved. Also, since charging apparatus 30 can supply an alternating-current power supply and direct-current power supply to in-vehicle devices, charging apparatus 30 can be used by devices with various power supply specifications inside vehicle 2, and convenience is further improved.

Figure 10:
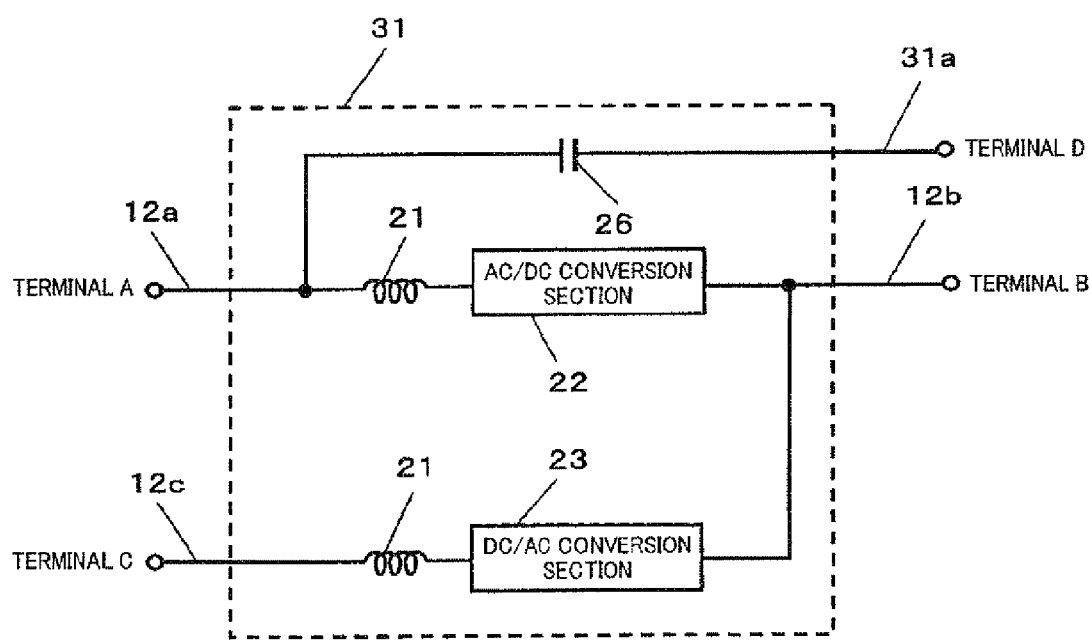
FIG. 10 is a block diagram showing another sample variant of FIG. 7.

Charging apparatus 30 in FIG. 7 has been described as capturing power line communication signals from terminal A, terminal B, and terminal C, but this is by no means limiting. For example, as shown in FIG. 10, charging apparatus 31 may be additionally provided with terminal D, and terminal A and terminal D may be connected via capacitor 26. Capacitor 26 functions as a bypass route to terminal D. By this means, a power line communication signal input from terminal A can be output to terminal D.

Terminal D is connected to an in-vehicle device having a power line communication function inside vehicle 2. According to this configuration, a power line communication signal can be injected into or extracted from terminal D via power line 31a, and in-vehicle devices can be connected and utilized as communication means. If outlet 13 is not provided, charging apparatus 31 shown in FIG. 10 does not require power line 12c, coil 21, and DC/AC conversion section 23.

Figure 11:
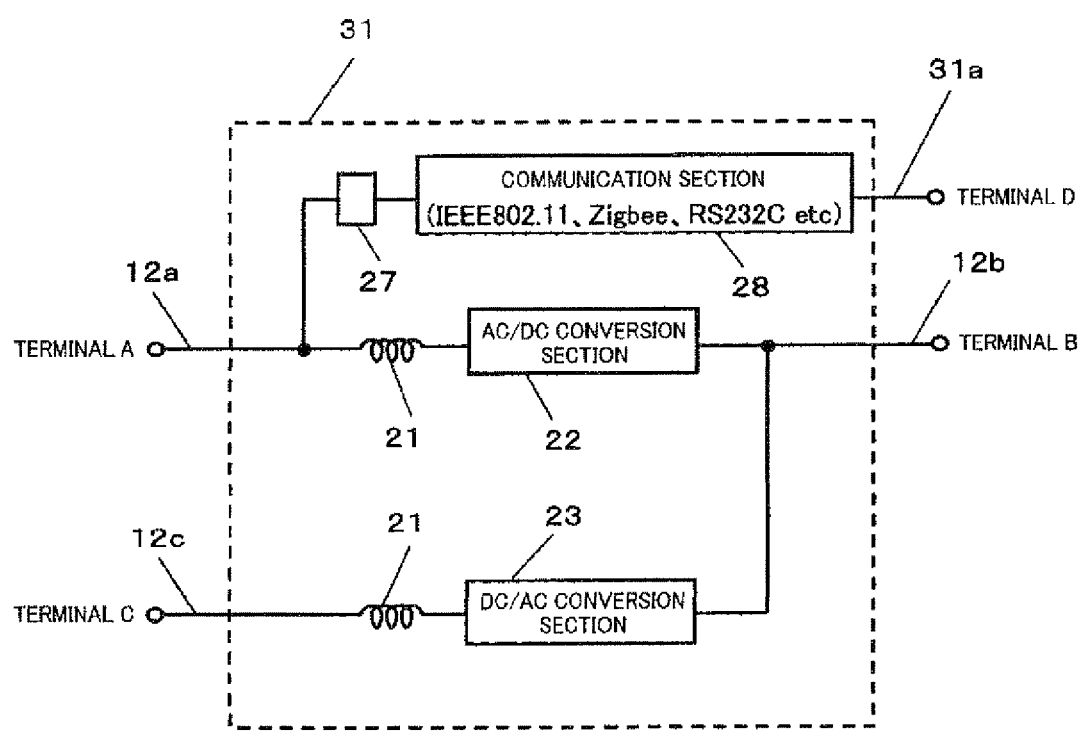
FIG. 11 is a block diagram showing a sample variant of FIG. 10.

Capacitor 26 in FIG. 10 may be replaced by interface 27 and communication section 28 as shown in FIG. 11. Terminal A is connected to communication section 28 via interface 27. Interface 27 has a function of connecting a power line communication signal to communication section 28. Interface 27 and communication section 28 function as a bypass route to terminal D. By this means, power line communication can be converted to a different communication means and output to terminal D, enabling easy adaptation to the communication methods of in-vehicle devices, and thereby improving convenience. If outlet 13 is not provided, charging apparatus 31 shown in FIG. 11 does not require power line 12c, coil 21, and DC/AC conversion section 23.

Radio, coaxial cable, and so forth can be considered as a channel used by communication section 28. If radio is used as a channel, the physical layer of communication section 28 may be made compliant with a standard such as IEEE802.11 or Zigbee. If a coaxial cable is used as a channel, the physical layer of communication section 28 may be made compliant with a standard such as RS232C.

Although not shown in the drawings, terminal D can be omitted if a communication section uses radio as a channel.

Figure 12:
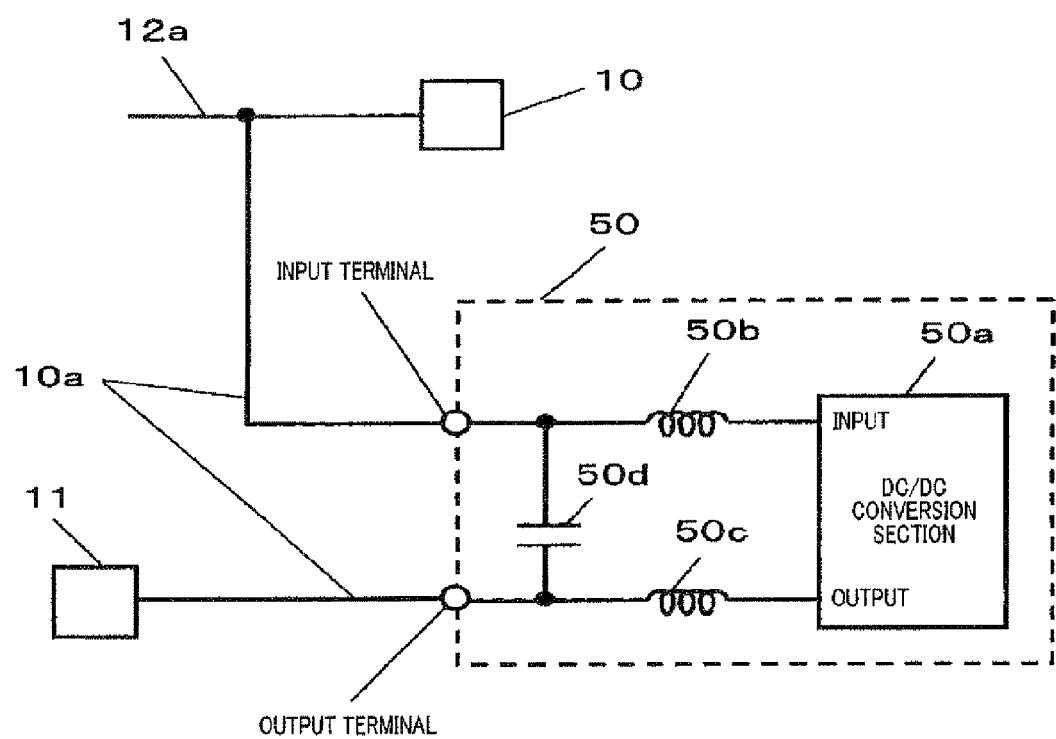
FIG. 12 is a block diagram showing a configuration of a voltage conversion apparatus charging apparatus for the above vehicle.

As shown in FIG. 12, voltage conversion apparatus 50 may be inserted in power line 10a. Voltage conversion apparatus 50 is provided in order to make a direct-current voltage output from charging apparatus 30 and an operating voltage output from in-vehicle device 11 match. In this case, voltage conversion apparatus 50 has DC/DC conversion section 50a that converts a direct-current voltage input from the input terminal via coil 50b to a different direct-current voltage, which DC/DC conversion section 50a outputs to the output terminal via coil 50c. The input terminal and output terminal of voltage conversion apparatus 50 are also connected via capacitor 50d. Absorption of a power line communication signal into DC/DC conversion section 50a is prevented by coil 50b and coil 50c, in addition to which coil 50b and coil 50c prevent noise generated from DC/DC conversion section 50a from interfering with power line communication. Also, a power line communication signal can bypass DC/DC conversion section 50a by means of capacitor 50d. By this means, power line communication can be performed using power line 10a even though voltage conversion apparatus 50 is inserted in power line 10*a*, and various device power supply specifications can be supported. DC/DC conversion section 50*a* has, for example, a DC/DC converter.

Figure 13:
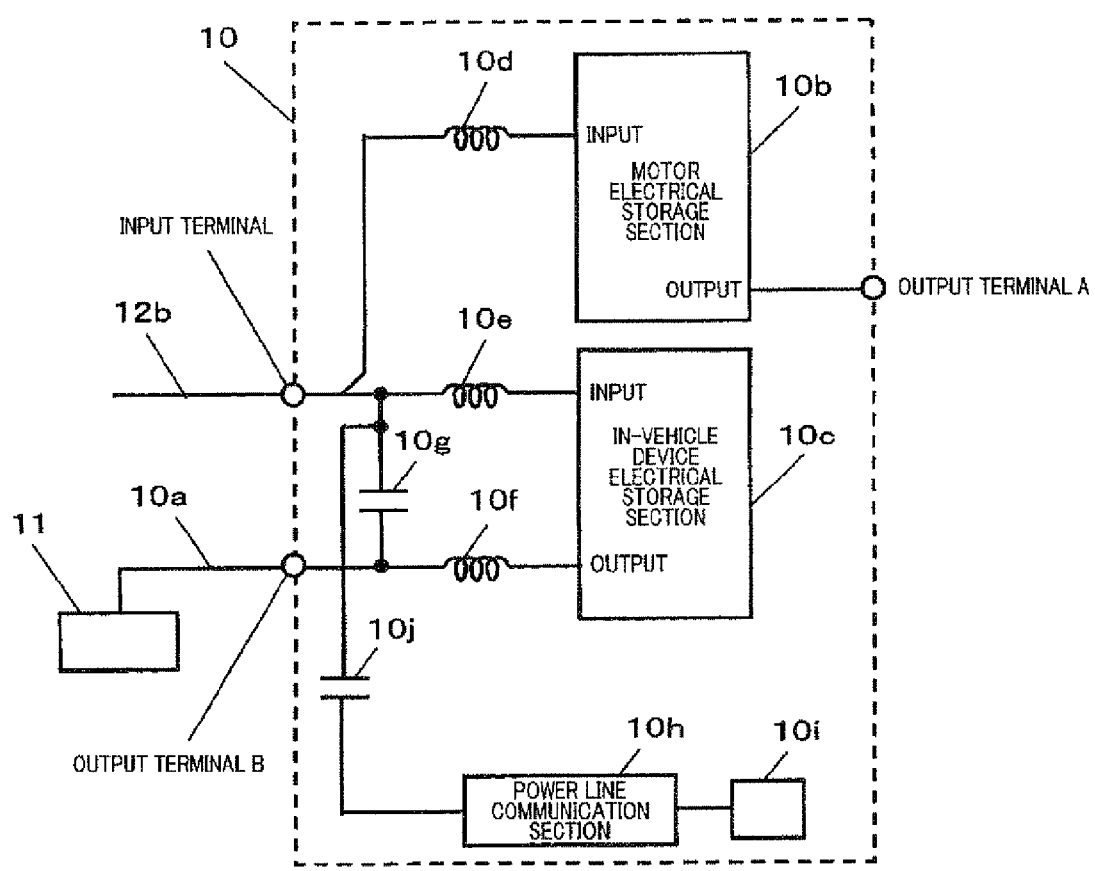
FIG. 13 is a block diagram showing a sample variant of FIG. 5.

As shown in FIG. 13, if power line communication section 10*h* and battery 10*i* supplying power to this power line communication section 10*h* are provided inside electrical storage apparatus 10, a connection is made from power line 12*b* to power line communication section 10*h* via capacitor 10*j*. By this means, information on the remaining charge, life, and so forth of electrical storage apparatus 10 can be transferred via power line 12*b*. Examples of information indicating life include the number of times to charge, duration of use, and so forth.

Figure 14:
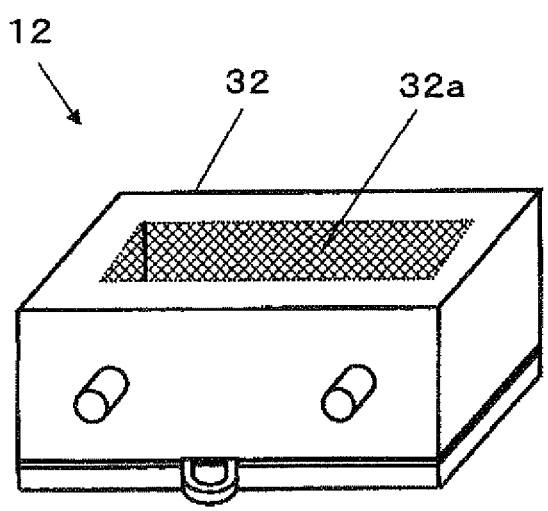
FIG. 14 is a perspective view of a configuration of the housing of a charging apparatus.

Provision may also be made for charging apparatus 12 circuitry to be accommodated in housing 32 whose inner surface 32*a* is covered with electromagnetic shielding material, as shown in FIG. 14. By this means, leakage from housing 32 of unwanted radiations generated from AC/DC conversion section 22 or DC/AC conversion section 23 is suppressed, thereby suppressing effects of unwanted radiations on other electronic devices. For example, effects of noise due to unwanted radiations on a radio receiver installed in vehicle 2 are suppressed. Charging apparatus 30 and charging apparatus 31 may also be accommodated in housing 32 in the same way. The electromagnetic shielding material is provided on part or all of inner surface 32*a*.

Figure 15:
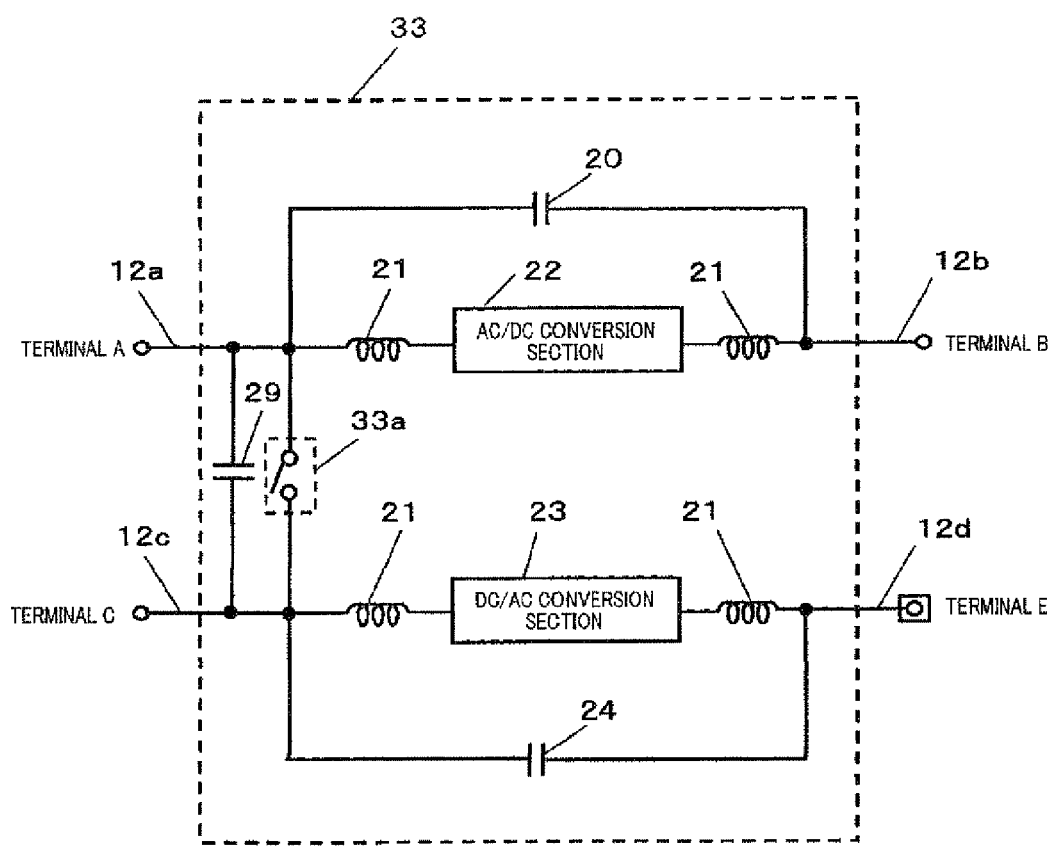
FIG. 15 is a block diagram showing another sample variant of FIG. 7.

If the output voltage of AC/DC conversion section 22 and the input voltage of DC/AC conversion section 23 are different, terminal B cannot be shared between AC/DC conversion section 22 and DC/AC conversion section 23 (see FIG. 7). In this case, the configuration of charging apparatus 33 shown in FIG. 15, for example, should be used instead of the configuration of charging apparatus 30. That is to say, independent dedicated terminals are provided for AC/DC conversion section 22 and DC/AC conversion section 23. In the example shown in FIG. 15, terminal B is provided as a terminal for AC/DC conversion section 22, and terminal E as a terminal for DC/AC conversion section 23. Power from electrical storage apparatus 10 is supplied to this terminal E.

Also, capacitor 29 (a third bypass section) is provided so as to connect power line 12*a* and power line 12*c* as a bypass section for moving power line communication signals back and forth between terminal B and terminal C and between terminal A and terminal C. Capacitor 29 has high impedance for a commercial power supply frequency, and has low impedance for a power line communication signal frequency (2 MHz to 28 MHz). Capacitor 29 may also be provided so as to connect power line 12*b* and power line 12*d*, or a configuration may be used in which power line 12*a* and power line 12*c*, and power line 12*b* and power line 12*d*, are connected respectively by capacitor 29. By this means, power line communication signals can be moved back and forth between terminal B and terminal C and between terminal A and terminal C even if the output voltage of AC/DC conversion section 22 and the input voltage of DC/AC conversion section 23 are different.

Capacitor 29 may also be provided so as to connect terminal A and terminal C, or may be provided so as to connect terminal B and terminal E. Furthermore, a capacitor that connects terminal A and terminal C and a capacitor that connects terminal B and terminal E may both be provided.

Also, switch 33*a* may be provided between terminal A and terminal C. The operation of switch 33*a* is set so as to interlock with switch 15. Specifically, a setting is made so that the switch is placed in a connecting state when vehicle 2 is stationary (when switch 15 is in a disconnecting state), and a setting is made so that the switch is placed in a disconnecting state when switch 15 is in a connected state. By this means, when switch 15 is placed in a disconnecting state and electrical storage apparatus 10 is charged, it is possible for in-vehicle device 40 to receive a supply of power from power supply 7 inside home 6 via power line 12*a* and power line 12*c*. And when switch 15 is in a connecting state, it is possible for in-vehicle device 40 to receive a supply of power from electrical storage apparatus 10.

Terminal A functions as an AC/DC conversion section 22 input terminal, and terminal B functions as an AC/DC conversion section 22 output terminal. Terminal C functions as a DC/AC conversion section 23 output terminal and terminal E functions as a DC/AC conversion section 23 input terminal.

Actual configurations are not limited to above-described Embodiments 1 and 2, and various variations and modifications may be possible without departing from the scope of these embodiments.

For example, charging apparatuses 12, 30, 31, and 33 need not be installed in vehicle 2, but may also be made independent of vehicle 2. Also, if charging apparatuses 12, 30, 31, and 33 are made independent of vehicle 2, charging apparatuses 12, 30, 31, and 33 may be of stationary or portable type.

Not only alternating-current power but also direct-current power can be envisaged as being supplied to power supply inlet 5. In this case, charging apparatuses 30 shown in FIGS. 7 through 9 and charging apparatuses 31 shown in FIGS. 10 and 11 are provided with a DC/DC conversion section instead of AC/DC conversion section 22. A DC/DC conversion section converts a direct-current voltage of several tens of volts to several hundreds of volts supplied to power supply inlet 5 to a direct-current voltage suitable for electrical storage apparatus 10.

An electric vehicle has been described as an example, but this embodiment is not limited to this, and can also be applied, for example, to a hybrid vehicle that uses both a motor and an engine.

The disclosure of Japanese Patent Application No. 2009-178600, filed on Jul. 31, 2009, including the specification, drawings and abstract, is incorporated herein by reference in its entirety.

INDUSTRIAL APPLICABILITY

A charging apparatus of an above embodiment supplies power to a vehicle having an electrical storage apparatus that stores power supplied from outside, and an in-vehicle device that is connected to the storage apparatus via a power line and performs power line communication using the power line; and employs a configuration having a first power conversion section that converts alternating-current power to direct-current power and supplies the direct-current power to the electrical storage apparatus, and a first bypass section that bypasses the first power conversion section and transmits a power line communication signal transmitted from the in-vehicle device; and therefore a power line communication signal can bypass the first power conversion section by means of the first bypass section, and an information device outside the vehicle body and an in-vehicle device, for example, can perform power line communication even via a charging apparatus.

Thus, the above embodiments is useful for a charging apparatus installed in a vehicle such as an electric vehicle or hybrid vehicle that stores power in an electrical storage apparatus via a power line from a charging apparatus installed inside the vehicle body or a charging apparatus outside the vehicle body, and runs by rotating a wheel by means of a

REFERENCE SIGNS LIST

1 Vehicle charging system
2 Vehicle
2a Vehicle body
2b Seat
3 Charging apparatus
4 Power line
5 Power supply inlet
6 Home
7 Power supply
7a, 12a, 12b, 12c, 12d, 31a Power lines
8 Information device
9 Power line communication apparatus
10 Electrical storage apparatus
10a Power line
10b Motor electrical storage section
10c In-vehicle device electrical storage section
10d, 10e, 10f, 21, 50b, 50c Coils
10g Capacitor
10h, 11a, 40a Power line communication sections
10i Battery
10j, 25b, 26, 50d Capacitors
11, 40 In-vehicle devices
12, 30, 31, 33 Charging apparatuses
13 Outlet
14 Vehicle control section
15 Switch (connecting section)
16 Motor driving section
17 Motor (wheel driving section)
18 Wheel
20 Capacitor (first bypass section)
22 AC/DC conversion section (first power conversion section)
23 DC/AC conversion section (second power conversion section)
24 Capacitor (second bypass section)
25 Bypass section
25a Communication transformer
27 Interface
28 Communication section
29 Capacitor (third bypass section)
32 Housing
32a Inner surface
33a Switch
50 Voltage conversion apparatus
50a DC/DC conversion section

The invention claimed is:

1. A charging apparatus that is provided in a vehicle having an electrical storage apparatus and an in-vehicle device, the electrical storage apparatus storing power supplied from outside, the in-vehicle device being supplied power from the electrical storage apparatus and performing power line communication for recording information from outside of the vehicle, and the charging apparatus being electrically connected to an information device outside of the vehicle via a first power line and being electrically connected to the in-vehicle device and the electrical storage apparatus via a second power line, the charging apparatus comprising:

a first power converter that converts first power supplied via the first power line to second power and supplies the second power to the electrical storage apparatus via the second power line;

a first bypass that is connected to the first power converter in parallel, and is connected between the first power line and the second power line for bypassing a power line communication signal transmitted from the in-vehicle device or the information device;

a second power converter that converts the second power output by the electrical storage apparatus to third power and supplies the third power to another in-vehicle device; and a second bypass that bypasses the second power converter and transmits a power line communication signal transmitted from the another in-vehicle device.

2. The charging apparatus according to claim 1, further comprising a third bypass that is provided at least one of (a) between an input terminal of the first power converter and an output terminal of the second power converter, and (b) between an output terminal of the first power converter and an input terminal of the second power converter, the third bypass causing the power line communication signal to bypass.

3. The charging apparatus according to claim 2, wherein at least one of the first bypass, the second bypass, and the third bypass section is a capacitor.

4. The charging apparatus according to claim 1, wherein:
at least one of the first bypass and the second bypass comprises:
a communication transformer having a winding ratio of N:1; and
a capacitor connected to each side of this communication transformer;
wherein a winding ratio on a side of a terminal of a higher line impedance is high in the communication transformer.

5. The charging apparatus according to claim 1, further comprising:
an input terminal to which the first power is input; and
an output terminal from which the second power is output,
wherein an inductance element is provided at least one of (a) between the input terminal and the first power converter, and (b) between the output terminal and the first power converter.

6. The charging apparatus according to claim 1, further comprising:
an input terminal to which direct-current power supplied from the electrical storage apparatus is input; and
an output terminal from which alternating-current power converted by the second power converter is output,
wherein an inductance element is provided at least one of (a) between the input terminal and the second power converter, and (b) between the output terminal and the second power conversion section converter.

7. The charging apparatus according to claim 1, wherein the first bypass comprises an output terminal that outputs the power line communication signal.

8. The charging apparatus according to claim 1, further comprising:
a communicator that performs communication using a communication method different from power line communication; and
a connector that connects the power line communication signal to the communication section,
wherein the first bypass includes the communicator and the connector.

9. The charging apparatus according to claim 1, wherein:
the first power is alternating-current power; and the second power is direct-current power.

10. The charging apparatus according to claim 1, wherein the first power and the second power are direct-current power.

11. The charging apparatus according to claim 1, wherein the second power converter converts direct-current power output by the electrical storage apparatus to alternating-current power.

12. The charging apparatus according to claim 1, wherein the second power converter converts first direct-current power output by the electrical storage apparatus to a second direct-current power.

13. The charging apparatus according to claim 1, further comprising
an electromagnetic shield that covers the charging apparatus.

14. A vehicle comprising:
the charging apparatus according to claim 1; and
a wheel driving section that rotates a wheel utilizing power stored in the electrical storage apparatus.

15. The charging apparatus according to claim 1, wherein at least one of the first bypass and the second bypass is a capacitor.

16. The charging apparatus according to claim 1, wherein an end of the first bypass is electrically connected to an end of the second bypass.

* * * * *